Patented Nov. 1, 1949

2,487,030

UNITED STATES PATENT OFFICE 2,487,030

PROCESS OF PRODUCING AN INTIMATE MIXTURE OF PARTIALLY DEXTRINIZED FARINACEOUS MATERIAL AND CALCINED GYPSUM

George W. Schustek, Jr., Oak Park, Ill., assignor to United States Gypsum Company, Chicago, Ill., a corporation of Illinois No Drawing. Application October 16, 1944, Serial No. 558,968

3 Claims. (Cl. 106—113)

The present invention relates to an improved type of gypsum composition containing quite uniformly therewith dispersed partially dextrinized cereal flour for the purpose of enabling the use of the composition particularly in the manufacture of gypsum wallboard in which the partially dextrinized cereal flour will act as a bond protecting agent.

The invention further pertains to an improved process for producing calcined gypsum products for use in the casting of statuary and other art objects, that is to say, the so-called art plasters and casting plasters, the purpose being to impart a surface hardness to the finished cast.

It has already been proposed to add various types of cooked carbohydrates to gypsum plasters, as for example in the manufacture of wallboard for the purpose of preventing the peeling of the fibrous cover sheets from the wallboard. As is known, this peeling results from the loosening of the bond which exists between the gypsum core and the fiber or cardboard covers of the plasterboard.

A number of prior art proposals involve the addition of either added starch or other carbohydrate. Various types of modified starches of varying degrees of viscosity, so-called dry pastes, such as "K. B. paste" and the addition of various types of partially dextrinized or more or less completely dextrinized starches and/or cereal flours.

The invention relates rather to an improved method of insuring the presence of such a partially dextrinized material in a thorough and even state of distribution throughout the calcined gypsum so that when the latter is mixed with water as in the formation of a wallboard core, the said dextrinized material will be evenly and uniformly distributed throughout the mixture.

When it is considered that comparatively small amounts of these dextrinized materials are used, namely, say from about ½% to 2½% of the weight of the plaster, it will be seen that its uniform distribution throughout such a large amount of material presents considerable mixing difficulties. For this reason in the former practice, the carbohydrate was either mixed with water and possibly even heated therein, and the suspension or solution thus obtained used as the gauging water for the gypsum, or at least as a constituent thereof.

Other alternatives were to attempt to mix the proper amount of the dextrinized material with the plaster at about the point where the core slurry was prepared, as on the plasterboard machine. Such methods, however, are cumbersome, expensive and require careful control, as otherwise the distribution of the dextrinized material will be uneven and inadequate.

The other difficulty was that it was necessary separately to dextrinize the material in advance or else to buy a dextrinized material. Both of these expedients are relatively expensive.

In accordance with the present invention, however, the admixing and dextrinization can be accomplished at the same time.

It is therefore one of the objects of the present invention to admix and dextrinize a cereal flour and/or starch directly with gypsum during its process of calcination whereby the temperature at which the mass of gypsum is maintained is sufficient to effect the desired dextrinization during the process of blending the flour or starch with the gypsum.

A further object of the invention is to produce a calcined gypsum composition containing therewith admixed the proper amount of correctly and properly dextrinized cereal flour or starch.

As an illustration of the manner of carrying out the present invention, gypsum in finely divided condition may be charged into a standard type of calcining kettle. This, as is well understood in the art, consists of a vertically positioned cylindrical kettle having a substantially flat bottom, the sides and bottom of the kettle being heated by combustion gases to such an extent that the contents of the kettle may be heated to from 250° to 450° F. The kettle is also provided with stirrers or sweeps which are kept in motion during the calcination. As a result of the heat imparted to the gypsum the same will lose 1½ molecules of its water crystallization, the said water escaping in the form of steam. As the steam leaves the powdered gypsum the entire mass of material in the kettle gets into a violent stage of agitation which is further aided by the travel of the sweeps, so that its visual appearance is that of a kettle of boiling water with the exception that the material is really dry, the steam being of course invisible.

By reason of the fact that during the calcination the gypsum particles are all kept apart from each other by this violent agitation, it becomes relatively easy to incorporate even comparatively small amounts of material with the gypsum. Advantage is therefore taken of this condition to feed into the gypsum preferably near the end of the calcination operation from about ½% to about 2½% of a prorerly acidulated cereal flour. The purpose of the acidulation is to enable the dextrinization to take place as a result of the heat imparted to the added acidulated cereal flour by the heat of the calcining gypsum. The amount of acid with which the cereal flour or starch should be treated is preferably about only $\tfrac{1}{10}$ of 1% calculated as commercial hydrochloric acid (HCl) of the kind containing about 27% to 28% of actual hydrogen chloride. Therefore the actual amount of acidity calculated of true HCl is even less than $\tfrac{1}{10}$ of 1%. However, an actual amount of HCl up to $\tfrac{1}{10}$ of 1% is not harmful.

It is noted that starch containing such a small amount of acid is much more readily dextrinized by heat than starch which has not been acidulated. In fact, to dextrinize neutral starch requires a temperature high enough to render the starch yellow or brown, as for example, in the manufacture of so-called yellow dextrine or British gum.

The temperatures employed in the present operation however, do not approach the temperatures used in making such yellow dextrine or British gum.

In carrying out the operation let it be assumed that the gypsum has been heated for a sufficient length of time until most of the so-called "drag" is over, in other words, where the operation is somewhere near the end. It is however, advantageous that the ebullition or agitation herein above referred to still be in evidence.

The operator thereupon feeds into the kettle while the sweeps are still running, the desired amount of the acidulated cereal flour or starch and allows the operation to continue until the calcination is completed, and the gypsum has reached either its first or second "settle." The latter is a term well known in the gypsum calcining art and will at once be understood by operators conversant with this field.

As a result of the addition of the acidulated cereal flour, the same will be nicely and evenly distributed through the mass of gypsum, and the heat, perhaps also aided by the water vapor present, will have dextrinized the starchy constituents of the flour or starch to a sufficient extent so that when the gypsum after cooling is eventually employed as a casting plaster or as the base for the core material of a plasterboard, the starchy constituent of the flour or starch will have had imparted to it the required degree of solubility in cold water, which is desirable for the purposes of having it act as a bond-protecting agent or a surface improver, as in the case of art plasters.

Among the materials which may be successfully employed for carrying out the present invention are acidulated corn flour, acidulated corn starch, acidulated rye flour, acidulated wheat flour or the starches derived from the said last mentioned cereals.

In general acidulated corn flour has been found to be both the least expensive and the most easily employed, and hence constitutes the preferred form of the present invention.

In general the amounts employed will vary from about ½% to 2½% of the total weight of the calcined gypsum, that is to say, a calcium sulfate hemihydrate.

So far as the acidulation of the cereal flour or starch is concerned, this can best be carried out by mixing dried starch, with the required amount of liquid hydrochloric acid and thoroughly mixing the same so as to distribute the acid therethrough. The starch should first be dried below its normal moisture content by an amount at least equal to the amount of water accompanying the acid. By reason of the fact that hydrochloric acid gives off HCl gas even at room temperatures, the acid will distribute itself quite uniformly throughout the starch.

Such acidulated flour or starch may be safely shipped in ordinary paper containers, and stored for considerable periods of time without having any essential change, as the amount of acid present is insufficient at ordinary storage temperatures to effect any far reaching modification of the starch molecule. However, when such faintly acidulated starch is heated, as to the temperatures of gypsum calcination, the acid is sufficient to initiate and effect the desired degree of dextrinization, without, however, completely dextrinizing the starch. In other words, the starch is converted into a condition in which it has just the right properties for the intended purpose.

It will be seen that there are many advantages in the present invention, among which may be enumerated simplicity of operation, uniformity of admixture, ease of control, elimination of separate mixing operations, and particularly the uniform distribution and controlled dextrinization of the cereal flour or starch.

Accordingly, applicant claims:

1. Process of producing an intimate mixture of partially dextrinized farinaceous material and calcined gypsum which comprises heating pulverized gypsum to a temperature within the range of from about 250° F. to about 450° F. to expel water of crystallization therefrom with resulting aeration of the mass of calcined gypsum thus produced as the result of the escape of said water in the form of steam, and dispersing into said aerated mass from about ½% to about 2½% by weight of a substantially dry farinaceous material acidulated to an extent sufficient partially to dextrinize said material.

2. Process of producing an intimate mixture of partially dextrinized farinaceous material and calcined gypsum which comprises heating pulverized gypsum to a temperature within the range of from about 250° F. to about 450° F. to expel water of crystallization therefrom with resulting aeration of the mass of calcined gypsum thus produced as the result of the escape of said water in the form of steam, and dispersing into said aerated mass from about ½% to about 2½% by weight of corn flour acidulated to an extent sufficient partially to dextrinize said corn flour.

3. Process of producing an intimate mixture of partially dextrinized farinaceous material and calcined gypsum which comprises heating pulverized gypsum to a temperature within the range of from about 250° F. to about 450° F. to expel water of crystallization therefrom with resulting aeration of the mass of calcined gypsum thus produced as the result of the escape of said water in the form of steam, and dispersing into said aerated mass from about ½% to about 2½% by weight of substantially dry corn flour acidulated with about $\tfrac{1}{10}$ of 1% of hydrochloric acid.

GEORGE W. SCHUSTEK, JR.

REFERENCES CITED

The following references are of record in the file of this patent:

UNITED STATES PATENTS

| Number | Name | Date |
|---|---|---|
| 437,140 | Sickler | Sept. 23, 1890 |
| 1,687,285 | Emerson | Oct. 9, 1928 |
| 2,044,401 | Roos | June 16, 1936 |
| 2,322,930 | Gardner | June 29, 1943 |